(12) United States Patent  
Asami et al.

(10) Patent No.: US 9,908,524 B2
(45) Date of Patent: Mar. 6, 2018

(54) CONTROL SYSTEM FOR HYBRID VEHICLE (71) Applicant: TOYOTA JIDOSHA KABUSHIKI KAISHA, Toyota-shi, Aichi-ken (JP)

(72) Inventors: Yoshikazu Asami, Gotenba (JP); Daigo Ando, Nagoya (JP); Hidekazu Nawata, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/252,762

(22) Filed: Aug. 31, 2016

(65) Prior Publication Data

US 2017/0066438 A1 Mar. 9, 2017

(30) Foreign Application Priority Data

Sep. 8, 2015 (JP) .................................. 2015-176799

(51) Int. Cl.
*B60W 10/06* (2006.01)
*B60W 10/08* (2006.01)
(Continued)

(52) U.S. Cl.
CPC ............... *B60W 20/50* (2013.01); *B60K 6/20* (2013.01); *B60W 10/06* (2013.01); *B60W 10/08* (2013.01);
(Continued)

(58) Field of Classification Search
CPC ............... B60W 10/08; B60W 50/038; B60W 2050/006; B60W 2530/00;
(Continued)

(56) References Cited

U.S. PATENT DOCUMENTS 5,301,764 A 4/1994 Gardner
6,018,694 A * 1/2000 Egami ...................... B60K 6/24
180/65.23
(Continued)

FOREIGN PATENT DOCUMENTS

JP 2000152413 A * 5/2000
JP 2000-156914 6/2000
(Continued)

OTHER PUBLICATIONS

Yu et al., "Control of hybrid excitation machine with open-winding structure for hybrid electric vehicles." Year: 2014, pp. 2910-2916.*
(Continued)

*Primary Examiner* — Tuan C To
(74) *Attorney, Agent, or Firm* — Finnegan, Henderson, Farabow, Garrett & Dunner, LLP (57) ABSTRACT

A control system may include a first electronic control unit programmed to control the engine and a second electronic control unit programmed to control the rotary electric machine. The second electronic control unit may be programmed to output an engine command signal to the first electronic control unit through communication with the first electronic control unit. The first electronic control unit may be programmed to control the engine in accordance with the engine command signal received from the second electronic control unit, when a communication abnormality with the second electronic control unit does not occur; and to execute fixing operation control in which the engine is controlled such that at least one of speed, output power, and output torque of the engine becomes a corresponding fixed value, when the communication abnormality with the second electronic control unit occurs.

4 Claims, 8 Drawing Sheets (51) Int. Cl.
  *B60K 6/20*  (2007.10)
  *B60W 20/50*  (2016.01)
  *B60W 50/038*  (2012.01)
  *B60K 6/46*  (2007.10)
  *B60K 6/445*  (2007.10)
  *B60W 50/00*  (2006.01)

(52) U.S. Cl.
  CPC ........... *B60W 50/038* (2013.01); *B60K 6/445* (2013.01); *B60K 6/46* (2013.01); *B60W 2050/0006* (2013.01); *B60W 2530/00* (2013.01); *B60W 2710/06* (2013.01); *B60W 2710/0644* (2013.01); *B60W 2710/0666* (2013.01); *B60W 2710/0677* (2013.01); *B60W 2710/08* (2013.01); *B60Y 2200/92* (2013.01); *B60Y 2300/26* (2013.01); *B60Y 2300/43* (2013.01); *B60Y 2300/60* (2013.01); *Y02T 10/6239* (2013.01); *Y02T 10/6286* (2013.01); *Y10S 903/93* (2013.01)

(58) Field of Classification Search
  CPC ..... B60W 2710/06; B60W 2710/0644; B60W 2710/0666; B60W 2710/0677; B60W 2710/08; B60K 6/20; B60K 6/445; B60K 6/46; B60Y 2200/92; B60Y 2300/26; B60Y 2300/43; B60Y 2300/60; Y02T 10/6239; Y02T 10/6286; Y02T 903/93
  See application file for complete search history.

(56) References Cited

U.S. PATENT DOCUMENTS

| | | | | |
|---|---|---|---|---|
| 6,321,150 | B1* | 11/2001 | Nitta | B60K 6/543 701/32.7 |
| 2004/0135448 | A1 | 7/2004 | Matsushita et al. | |
| 2006/0018636 | A1* | 1/2006 | Watanabe | F02D 11/107 388/804 |
| 2013/0006486 | A1* | 1/2013 | Shimizu | F16H 61/12 701/51 |
| 2013/0073130 | A1* | 3/2013 | Jung | B60W 20/00 701/22 |
| 2013/0271051 | A1* | 10/2013 | Goto | B60W 10/08 318/400.26 |
| 2014/0163804 | A1* | 6/2014 | Kaneko | B60K 6/46 701/22 |
| 2014/0340007 | A1* | 11/2014 | Suhama | H02P 21/0021 318/400.02 |
| 2014/0349811 | A1* | 11/2014 | Ichikawa | B60W 10/02 477/5 |
| 2014/0379184 | A1* | 12/2014 | Kim | F02N 11/108 701/22 |
| 2015/0167615 | A1* | 6/2015 | Komuro | B60K 6/48 290/31 |
| 2015/0291059 | A1* | 10/2015 | Kawasaki | B60W 20/00 701/22 |
| 2016/0221469 | A1* | 8/2016 | Cheng | B60K 6/48 |

FOREIGN PATENT DOCUMENTS

| | | | |
|---|---|---|---|
| JP | 2002-285905 A | | 10/2002 |
| JP | 2004-208366 | | 7/2004 |
| JP | 2004-208368 A | | 7/2004 |
| JP | 2007-055287 A | | 3/2007 |
| JP | 2011-031659 A | | 2/2011 |
| JP | 2012116464 A | * | 6/2012 ........... B60W 10/06 |
| JP | 2014-231244 | | 12/2014 |
| JP | 2015107711 A | * | 6/2015 |
| JP | 2015214176 A | * | 12/2015 |

OTHER PUBLICATIONS

Federica et al., "Dynamic Modeling and control of power-split HEV with multi-phase electric machines under fault condition," Year: 2013, pp. 2969-2975.*

* cited by examiner

CONTROL SYSTEM FOR HYBRID VEHICLE

CROSS-REFERENCE TO RELATED APPLICATION

This application is based on and claims the benefit of priority of Japanese Patent Application No. 2015-176799 filed on Sep. 8, 2015, which is incorporated herein by reference in its entirety.

TECHNICAL FIELD

The present disclosure relates to a control system for a hybrid vehicle that travels by using power of at least one of an engine and a rotary electric machine.

BACKGROUND

A hybrid vehicle that includes an engine and a motor generator is disclosed in Japanese Patent Application Publication No. 2014-231244 (JP 2014-231244 A). This hybrid vehicle includes an engine control unit and a hybrid control unit. The hybrid control unit controls the motor generator and outputs an engine command signal to the engine control unit through communication with the engine control unit. The engine control unit controls the engine in accordance with the engine command signal received from the hybrid control unit. The hybrid control unit stops an operation of the engine by shutting off a relay for supplying electric power to a fuel injection valve of the engine when an abnormality occurs to the communication with the engine control unit. In this way, even when the abnormality occurs to the communication between the hybrid control unit and the engine control unit, the hybrid control unit can directly stop the engine without communicating with the engine control unit. Thus, an excess increase in engine output can be prevented.

In the hybrid vehicle disclosed in JP 2014-231244 A, the operation of the engine is stopped when the communication abnormality between the hybrid control unit and the engine control unit occurs. Thus, the vehicle cannot evacuation-travel by using power of the engine.

SUMMARY

Embodiments of the present disclosure provide a control system for a hybrid vehicle that enables an evacuation travel of the vehicle by using engine power when a communication abnormality occurs between a first control unit (an engine control unit) and a second control unit (a hybrid control unit).

In a control system for a hybrid vehicle according to the present disclosure, the hybrid vehicle may be configured to travel by using power of at least one of an engine and a rotary electric machine. The control system may include a first electronic control unit and a second electronic control unit. The first electronic control unit may be configured to control the engine. The second electronic control unit may be configured to control the rotary electric machine. The second electronic control unit may be configured to output an engine command signal to the first electronic control unit through communication with the first electronic control unit. The first electronic control unit may be configured to: a) control the engine in accordance with the engine command signal received from the second electronic control unit when a communication abnormality with the second electronic control unit does not occur; and b) execute fixing operation control in which the engine is controlled such that at least one of speed, output power, and output torque of the engine becomes a corresponding fixed value when the communication abnormality with the second electronic control unit occurs.

According to the control system of the present disclosure, the first electronic control unit may not stop the engine but may execute the fixing operation control, in which the engine is operated by fixing at least one of the speed, the output power, and the output torque of the engine when the communication abnormality with the second electronic control unit occurs. Accordingly, the vehicle can evacuation-travel by using the power of the engine even when a communication abnormality between the first electronic control unit and the second electronic control unit occurs (when the engine command signal cannot be output from the second electronic control unit to the first electronic control unit).

The second electronic control unit may be configured to control the rotary electric machine so as to transmit requested drive power requested by a user to a drive wheel under a precondition that the engine is operated in accordance with the engine command signal when a communication abnormality with the first electronic control unit does not occur. In addition, the second electronic control unit may be configured to control the rotary electronic machine so as to transmit the requested drive power by the user to the drive wheel under a precondition that the engine is operated by the fixing operation control when the communication abnormality with the first electronic control unit occurs.

According to the control system of the present disclosure, output of the rotary electric machine may be adjusted so as to transmit the requested drive power requested by the user to the drive wheel under the precondition that the engine is operated by the fixing operation control even when the communication abnormality between the first electronic control unit and the second electronic control unit occurs. Thus, the requested drive power by the user can be transmitted to the drive wheel even during an evacuation travel.

The first electronic control unit may be configured to stop the engine without executing the fixing operation control when the communication abnormality with the second electronic control unit occurs and at least one of the speed, the output power, and the output torque of the engine deviates from the corresponding fixed value by a specified value or larger.

An engine stop command cannot be output from the second electronic control unit to the first electronic control unit when a communication abnormality between the first electronic control unit and the second electronic control unit occurs. However, in the control system of the present disclosure, the first electronic control unit may stop the engine without executing the fixing operation control when the communication abnormality between the first electronic control unit and the second electronic control unit occurs and at least one of the speed, the output power, and the output torque of the engine deviates from the fixed value by the specified value or larger. Accordingly, when the communication abnormality between the first electronic control unit and the second electronic control unit occurs, not only the engine can continuously be operated by the fixing operation control, but also the engine can be stopped.

The engine may mechanically be coupled to the rotary electric machine. The first electronic control unit may output a stop request to stop the engine without executing the fixing operation control when the communication abnormality with the second electronic control unit occurs and the speed of the engine deviates from a fixed value by a specified value or larger. In addition, the second electronic control unit may be configured to control the rotary electric machine such that the speed of the engine deviates from the fixed value by the specified value or larger when a communication abnormality with the first electronic control unit occurs and the stop request is present.

When the communication abnormality between the first electronic control unit and the second electronic control unit occurs, the second electronic control unit comprehends that the engine stop request may be present (it is a situation where the engine should be stopped). Even in such a case, the second electronic control unit cannot output the engine stop command to the first electronic control unit due to an influence of the communication abnormality. However, in the control system of the present disclosure, the first electronic control unit may stop the engine when the speed of the engine deviates from the fixed value by the specified value or larger. In addition, when the engine stop request is present (it is the situation where the engine should be stopped), the second electronic control unit may make the speed of the engine deviate from the fixed value by the specified value or larger by controlling the rotary electric machine that are mechanically coupled to the engine. In this way, even when the communication abnormality between the first electronic control unit and the second electronic control unit occurs, the second electronic control unit can indirectly stop the engine. In some embodiments, a hybrid vehicle includes an engine electronic control unit (ECU) for controlling the engine and a hybrid ECU for controlling motor generators and outputting the engine command signal to the engine ECU. When the abnormality does not occur to the communication with the hybrid ECU, the engine ECU controls the engine such that the engine operation point (the speed and the torque) becomes a command operation point that follows the engine command signal received from the hybrid ECU. On the other hand, when the abnormality occurs to the communication with the hybrid ECU, the engine ECU executes the fixing operation control in which the engine is controlled such that the engine operation point (the speed and the torque) becomes the predetermined fixed operation point.

BRIEF DESCRIPTION OF THE DRAWINGS

Features of exemplary embodiments of the present disclosure will be described below with reference to the accompanying drawings, in which like numerals denote like elements, and wherein.

DETAILED DESCRIPTION OF EMBODIMENTS

A description will hereinafter be made on embodiments of the present disclosure with reference to the drawings. In the following description, the same components are denoted by the same reference numerals. Names and functions thereof are also the same. Thus, a detailed description thereon will not be repeated.

Figure 1:
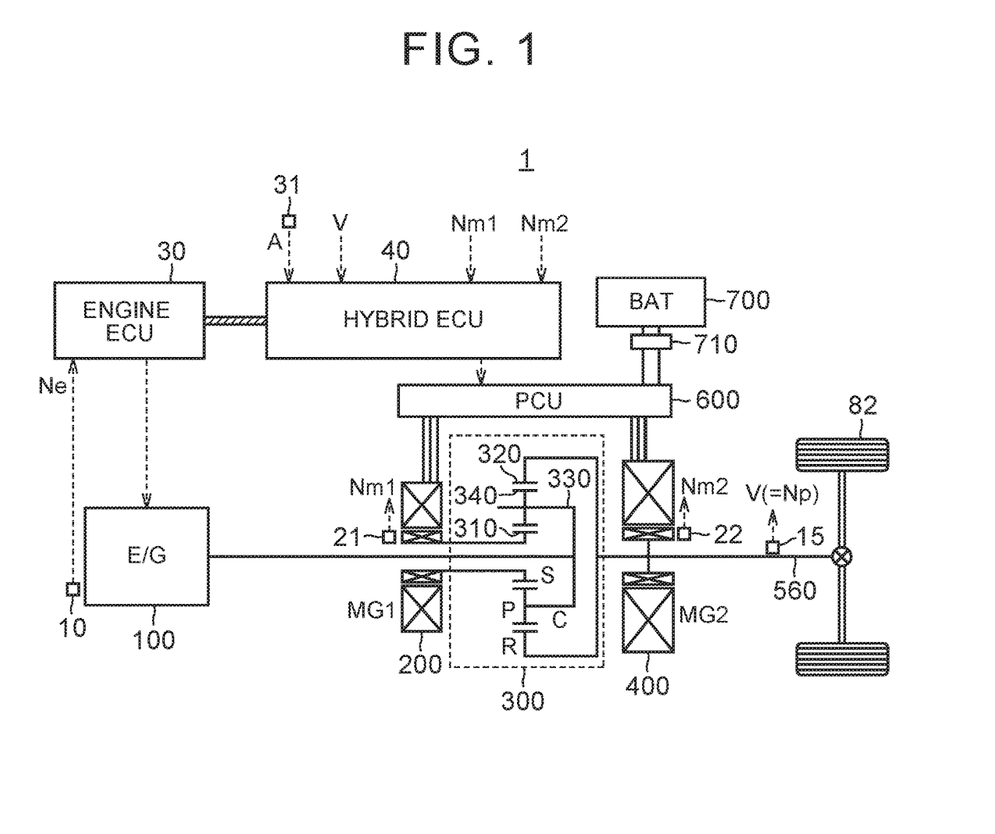
FIG. 1 is an overall block diagram of a vehicle.

FIG. 1 is an overall block diagram of a vehicle 1 according to this embodiment. The vehicle 1 includes an engine 100, a first motor generator (MG) 200, a power split mechanism 300, a second MG 400, an output shaft 560, drive wheels 82, a power control unit (PCU) 600, a battery 700, and a system main relay (SMR) 710. The vehicle 1 further includes an engine electronic control unit (ECU) 30 and a hybrid ECU 40.

The vehicle 1 is a hybrid vehicle that travels by using power of at least one of the engine 100 and the second MG 400. The engine 100 is an internal combustion engine that outputs power by combusting fuel. The first MG 200 and the second MG 400 are AC rotary electric machines and also function as a motor and a generator.

Hereinafter, there is a case where a speed of the engine 100, a rotational speed of the first MG 200, a rotational speed of the second MG 400 are respectively described as an "engine speed Ne," a "first MG rotational speed Nm1," and a "second MG rotational speed Nm2." In addition, there is a case where output torque of the engine 100, output torque of the first MG 200, and output torque of the second MG 400 are respectively described as "engine torque Te," "first MG torque Tm1," and "second MG torque Tm2." Furthermore, there is a case where output power of the engine 100 and output power of the second MG 400 are respectively described as "engine power Pe" and "second MG power Pm2."

The power split mechanism 300 is a planetary gear mechanism that has a sun gear (S) 310, a ring gear (R) 320, a pinion gear (P) 340 meshing with the sun gear (S) 310 and the ring gear (R) 320, and a carrier (C) 330 holding the pinion gear (P) 340 in such a manner as to allow rotation and revolution thereof. The carrier (C) 330 is coupled to the engine 100. The sun gear (S) 310 is coupled to the first MG 200. The ring gear (R) 320 is coupled to the second MG 400 and the drive wheels 82 via the output shaft 560.

Figure 2:
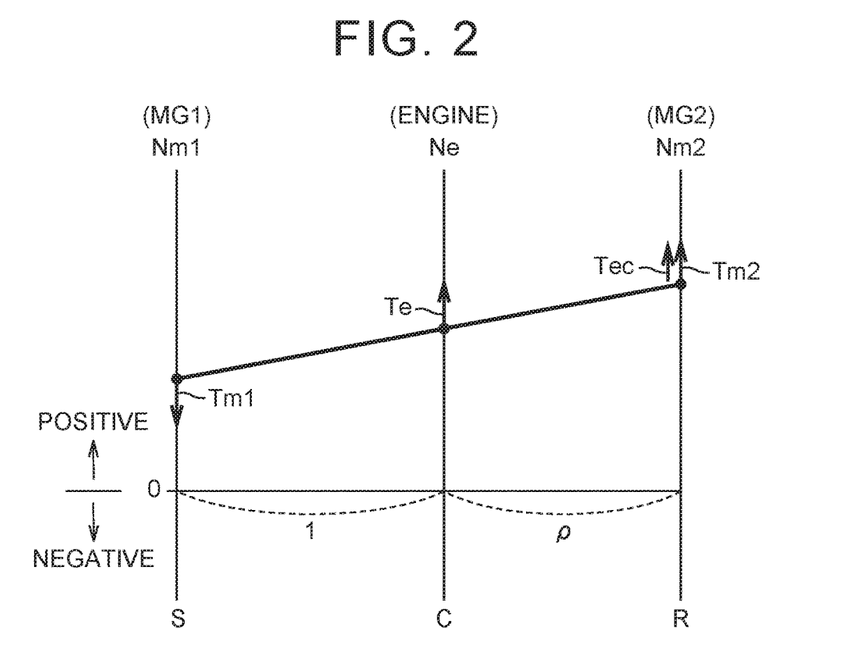
FIG. 2 is a collinear diagram of a power split mechanism.

FIG. 2 is a collinear diagram of the power split mechanism 300. Because the engine 100, the first MG 200, and the second MG 400 are mechanically coupled by the power split mechanism 300, the first MG rotational speed Nm1 (a rotational speed of the sun gear (S) 310), the engine speed Ne (a rotational speed of the carrier (C) 330), and the second MG rotational speed Nm2 (a rotational speed of the ring gear (R) 320) establish a relationship of being connected in a straight line on a collinear diagram of the power split mechanism 300 (a relationship where, when any two of the rotational speeds are determined, the rest of the rotational speed is also determined, hereinafter also referred to as a "relationship of the collinear diagram"). Accordingly, when the second MG rotational speed Nm2 is constant, a positive correlation exists between the engine speed Ne and the first MG rotational speed Nm1 (a relationship where one of the rotational speeds is reduced when the other rotational speed is reduced and one of the rotational speeds is increased when the other rotational speed is increased).

Returning to FIG. 1, the PCU 600 converts high-voltage DC power that is supplied from the battery 700 to AC power, and outputs the AC power to the first MG 200 and/or the second MG 400. The first MG 200 and/or the second MG 400 is thereby driven. The PCU 600 also converts the AC power that is generated by the first MG 200 and/or the second MG 400 to the DC power and outputs the DC power to the battery 700. The battery 700 is thereby charged. The PCU 600 can also drive the second MG 400 by using the electric power generated by the first MG 200.

The battery 700 is a secondary battery that stores the high-voltage (for example, about 200 V) DC power used to drive the first MG 200 and/or the second MG 400. The battery 700 is configured by primarily including a nickel-metal hydride battery or a lithium-ion battery.

The SMR 710 is a relay that connects/shuts off the battery 700, the PCU 600, and an electrical system including the first MG 200 and the second MG 400.

The vehicle 1 is further provided with plural sensors that detect various types of required information for control of the vehicle 1, such as an engine speed sensor 10, an output shaft rotational speed sensor 15, resolvers 21, 22, and an accelerator pedal position sensor 31. The engine speed sensor 10 detects the engine speed Ne and outputs a detection result to the engine ECU 30. The resolver 21 detects the first MG rotational speed Nm1 and outputs a detection result to the hybrid ECU 40. The resolver 22 detects the second MG rotational speed Nm2 and outputs a detection result to the hybrid ECU 40. The output shaft rotational speed sensor 15 detects a rotational speed Np of the output shaft 560 as a vehicle speed V and outputs a detection result to the hybrid ECU 40. The accelerator pedal position sensor 31 detects an operation amount of an accelerator pedal by a user (hereinafter also referred to as an "accelerator pedal operation amount A") and outputs a detection result to the hybrid ECU 40.

Figure 9:
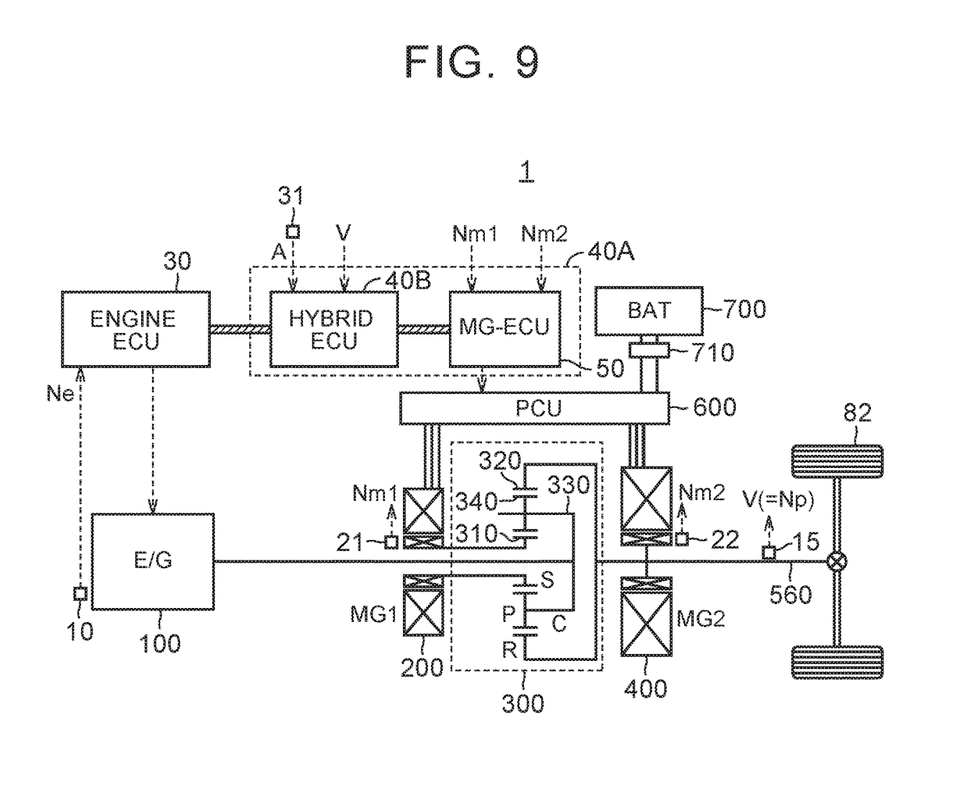
FIG. 9 is an overall block diagram of a vehicle.

The engine ECU 30 and the hybrid ECU 40 each have a built-in central processing unit (CPU) and a built-in memory, which are not shown. For example, each of ECU 30 and hybrid ECU 40 may be programmed to perform disclosed functions. Digitized instructions, which may be stored or retrieved, may be executed by ECU 30 and hybrid ECU 40 to perform disclosed functions. The digitized instructions may be stored in a non-transitory computer-readable medium. For example, the engine ECU 30 and the hybrid ECU 40 execute specified computation processing on the basis of information stored in said memory and the information from each of the sensors. Note that, although the hybrid ECU 40 is shown in FIG. 1, a hybrid ECU 40B and an MG-ECU 50 can be integrated as one ECU 40A as in FIG. 9. In FIG. 9, the ECU 40A is one example of the "second electronic control unit." In this case, the MG-ECU 50 receives the first MG rotational speed Nm1 and the second MG rotational speed Nm2 from the resolver 21 and the resolver 22, respectively.

The hybrid ECU 40 is connected to the engine ECU 30 via a communication line and mutually communicates with the engine ECU 30 for overall control of the engine 100, the first MG 200, and the second MG 400.

More specifically, the hybrid ECU 40 computes drive power that is requested to the vehicle 1 by the user (hereinafter also referred to as "requested drive power Preq") on the basis of the accelerator pedal operation amount A from the accelerator pedal position sensor 31, the vehicle speed V from the output shaft rotational speed sensor 15, and the like. The hybrid ECU 40 divides the computed requested drive power Preq into engine requested power Pereq and second MG requested power Pm2req while a state of the battery 700 is taken into consideration. Then, the hybrid ECU 40 generates an engine command signal (an engine command speed Necom, engine command torque Tecom) to make the engine power Pe become the engine requested power Pereq, generates a first MG command signal (a first MG command rotational speed Nm1com, first MG command torque Tm1com) to transmit the output of the engine 100 to the output shaft 560, and generates a second MG command signal (a second MG command rotational speed Nm2com, second MG command torque Tm2com) to make the second MG power Pm2 become the second MG requested power Pm2req. The hybrid ECU 40 then outputs the engine command signal to the engine ECU 30 and obtains information indicative of a state of the engine 100 from the engine ECU 30. The hybrid ECU 40 outputs the first MG command signal and the second MG command signal and obtains information indicative of states of the first MG 200 and the second MG 400.

The engine ECU 30 outputs information indicative of the state of the engine 100 (for example, the engine speed Ne detected by the engine speed sensor 10 and the like) to the hybrid ECU 40. The engine ECU 30 also controls output of the engine 100 (more specifically, a throttle opening degree, ignition timing, a fuel injection amount, and the like) in accordance with the engine command signal from the hybrid ECU 40.

The hybrid ECU 40 obtains the information indicative of the states of the first MG 200 and the second MG 400 (for example, the first MG rotational speed Nm1 and the second MG rotational speed Nm2 respectively detected by the resolvers 21, 22, and the like). The hybrid ECU 40 also controls output of the first MG 200 and the second MG 400 (more specifically, energization amounts and the like) in accordance with the first MG command signal and the second MG command signal, respectively.

In the vehicle 1 that has the configuration as described above, the engine 100 cannot appropriately be controlled in response to the user's request when a communication abnormality occurs between the engine ECU 30 and the hybrid ECU 40 (hereinafter simply referred to as an "ENG-HV communication abnormality"). That is, the hybrid ECU 40 cannot output the engine command signal to the engine ECU 30. Meanwhile, because the engine ECU 30 cannot receive the engine command signal from the hybrid ECU 40, the engine ECU 30 cannot comprehend how to control the engine 100.

If the engine ECU 30 uniformly stops the engine 100 to avoid an excess increase in the output of the engine 100, the vehicle 1 cannot evacuation-travel by using the power of the engine 100 when the engine 100 is uniformly stopped.

Instead, in the embodiments of the present disclosure, a fail safe operation as will be described below is performed when the ENG-HV communication abnormality occurs. The engine ECU 30 executes "fixing control (fixing operation control)" in which the engine 100 is operated such that engine operation point (the engine speed Ne and the engine torque Te) becomes fixed operation point (a fixed speed Nfix and fixed torque Tfix). Note that the fixed speed Nfix used in the fixing control is set to a positive value. That is, the engine 100 is not stopped but is maintained in an operation state during execution of the fixing control.

Furthermore, the hybrid ECU 40 controls the first MG 200 and the second MG 400 to satisfy the requested drive power Preq (to transmit the requested drive power Preq to the drive wheels 82) under a precondition that the engine 100 is operated by the fixing control. That is, the hybrid ECU 40 controls the first MG 200 such that first MG operation point (the first MG rotational speed Nm1 and the first MG torque Tm1) becomes first MG command operation point (the first MG command rotational speed Nm1com and the first MG command torque Tm1com), and controls the second MG 400 such that second MG operation point (the second MG rotational speed Nm2 and the second MG torque Tm2) become second MG command operation point (the second MG command rotational speed Nm2com and the second MG command torque Tm2com). In this way, when the engine power Pe is not high enough for the engine requested power Pereq due to the operation of the engine 100 by the fixing control, an amount of shortage is added to the second MG power Pm2. As a result, even when the ENG-HV communication abnormality occurs, the vehicle 1 can evacuation-travel while the requested drive power Preq is satisfied by the engine power Pe and the second MG power Pm2.

Note that a normal operation as will be described below is performed when the ENG-HV communication abnormality does not occur. The engine ECU 30 executes "command control" in which the engine 100 is operated such that the engine operation point becomes command operation point that follows the engine command signal received from the hybrid ECU 40 (the engine command speed Necom and the engine command torque Tecom). Furthermore, the hybrid ECU 40 controls the first MG 200 and the second MG 400 to satisfy the requested drive power Preq under a precondition that the engine 100 is operated by the command control.

Figure 3:
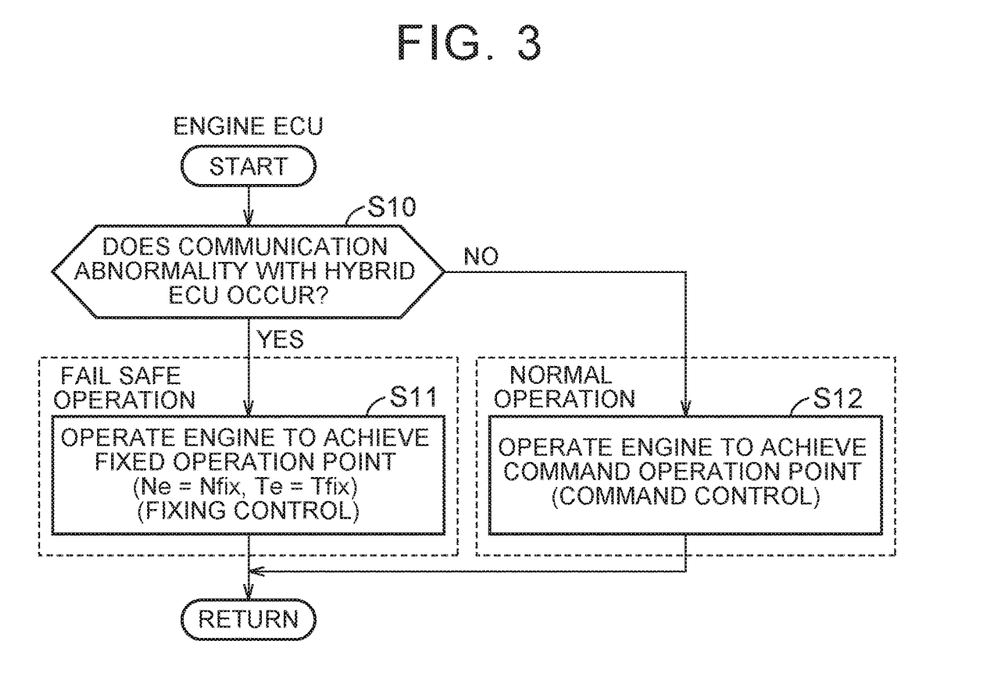
FIG. 3 is a flowchart (part 1) that shows a processing procedure of an engine ECU.

FIG. 3 is a flowchart that shows a processing procedure executed by the engine ECU 30. This flowchart is repeatedly executed at specified intervals.

In step (hereinafter abbreviated as "S") 10, the engine ECU 30 determines whether the communication abnormality with the hybrid ECU 40 occurs. For example, the engine ECU 30 determines that the communication abnormality with the hybrid ECU 40 occurs when the information from the hybrid ECU 40 cannot continuously be received for a specified period.

If the communication abnormality with the hybrid ECU 40 does not occur (NO in S10), the engine ECU 30 executes the above-described "command control" in S12. That is, the engine ECU 30 operates the engine 100 such that the engine operation point becomes the command operation point received from the hybrid ECU 40.

On the other hand, if the communication abnormality with the hybrid ECU 40 occurs (YES in S10), the engine ECU 30 executes the above-described "fixing control" in S11. That is, the engine ECU 30 operates the engine 100 such that the engine operation point becomes the predetermined fixed operation point. In this way, even when the ENG-HV communication abnormality occurs, the vehicle 1 can evacuation-travel by using the power of the engine 100.

Figure 4:
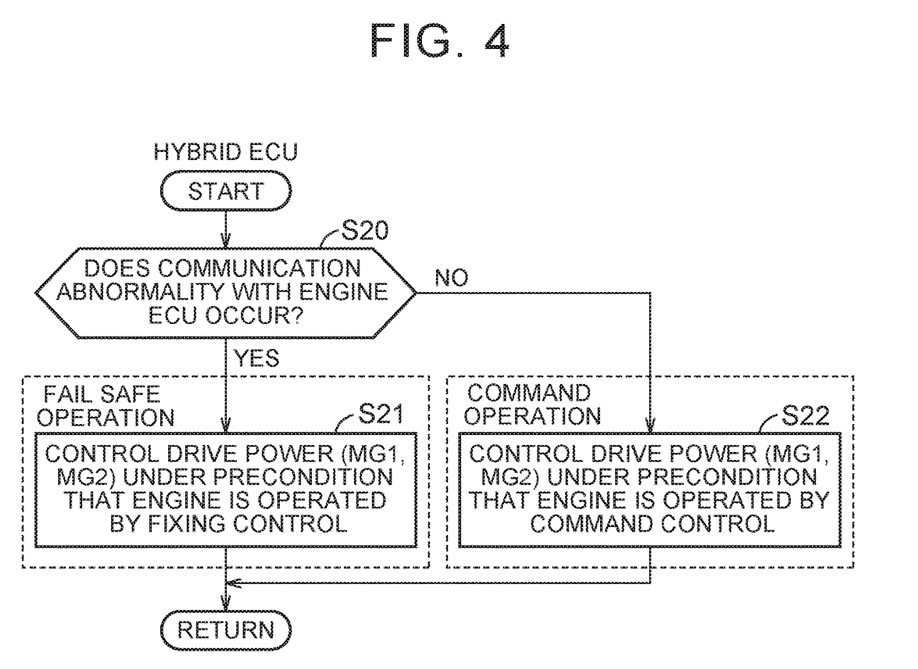
FIG. 4 is a flowchart (part 1) that shows a processing procedure of a hybrid ECU.

FIG. 4 is a flowchart that shows a processing procedure executed by the hybrid ECU 40. This flowchart is repeatedly executed at specified intervals.

In S20, the hybrid ECU 40 determines whether the communication abnormality with the engine ECU 30 occurs.

If the communication abnormality with the engine ECU 30 does not occur (NO in S20), in S22, the hybrid ECU 40 controls the drive power (the first MG 200 and the second MG 400) to satisfy the requested drive power Preq under the precondition that the engine 100 is operated by the command control.

On the other hand, if the communication abnormality with the engine ECU 30 occurs (YES in S20), in S21, the hybrid ECU 40 controls the drive power (the first MG 200 and the second MG 400) to satisfy the requested drive power Preq under the precondition that the engine 100 is operated by the fixing control. Accordingly, when the engine power Pe is not high enough for the engine requested power Pereq due to the operation of the engine 100 by the fixing control, the amount of shortage is added to the second MG requested power Pm2req and is compensated by the second MG power Pm2. As a result, even when the ENG-HV communication abnormality occurs, the vehicle 1 can evacuation-travel while the requested drive power Preq is satisfied.

As it has been described so far, when the communication abnormality with the hybrid ECU 40 occurs, the engine 30 according to this embodiment does not stop the engine 100 but executes the "fixing control" in which the engine 100 is operated with the engine operation point fixed to the predetermined fixed operation point. In this way, even when the ENG-HV communication abnormality occurs, the vehicle 1 can evacuation-travel by using the power of the engine 100.

Note that, because the engine speed Ne and the engine torque Te are fixed by the fixing control in this embodiment, as a result, the engine power Pe is also fixed. However, the fixing control is not limited to control for fixing all of the engine speed Ne, the engine torque Te, and the engine power Pe but may be control for fixing at least one of the engine speed Ne, the engine torque Te, and the engine power Pe. For example, one of the engine speed Ne and the engine torque Te may be fixed by the fixing control, and the other thereof may not be fixed (that is, the engine power Pe is not fixed). Alternatively, only the engine power Pe may be fixed by the fixing control, and fluctuations of the engine speed Ne and the engine torque Te may be permitted.

In the embodiments of the present disclosure, when the ENG-HV communication abnormality occurs, the engine 100 is operated at the fixed operation point in the fixing control by the engine ECU 30. Because the ENG-HV communication abnormality occurs during the execution of the fixing control, the hybrid ECU 40 cannot output a command to stop the engine 100 to the engine ECU 30.

That is, in the embodiments of the present disclosure, the hybrid ECU 40 comprehends presence of an engine stop request (a situation where the engine should be stopped) when the ENG-HV communication abnormality occurs. However, the hybrid ECU 40 cannot output the command to stop the engine 100 to the engine ECU 30 due to an influence of the ENG-HV communication abnormality. Accordingly, the engine ECU 30 keeps operating the engine 100 at the fixed operation point.

In another embodiment where the communication abnormality with the hybrid ECU 40 occurs and the engine speed Ne detected by the engine speed sensor 10 deviates from the fixed speed Nfix by a specified value $\alpha$ ($\alpha$>0) or larger, the engine ECU 30 does not execute the fixing control but stops the engine 100. Thus, when the ENG-HV communication abnormality occurs, not only the engine 100 can be operated by the fixing control, but also the engine 100 can be stopped without executing the fixing control.

Furthermore, when the communication abnormality with the engine ECU 30 occurs and the engine stop request is present (it is the situation where the engine 100 should be stopped), the hybrid ECU 40 controls the first MG 200 such that the engine speed Ne deviates from the fixed speed Nfix by the specified value $\alpha$ or larger. When the engine speed Ne deviates from the fixed speed Nfix by the specified value $\alpha$ or larger by this control, the engine ECU 30 stops the engine 100. As a result, even when the ENG-HV communication abnormality occurs, the engine 100 can indirectly be stopped through the control of the first MG 200 by the hybrid ECU 40.

Figure 5:
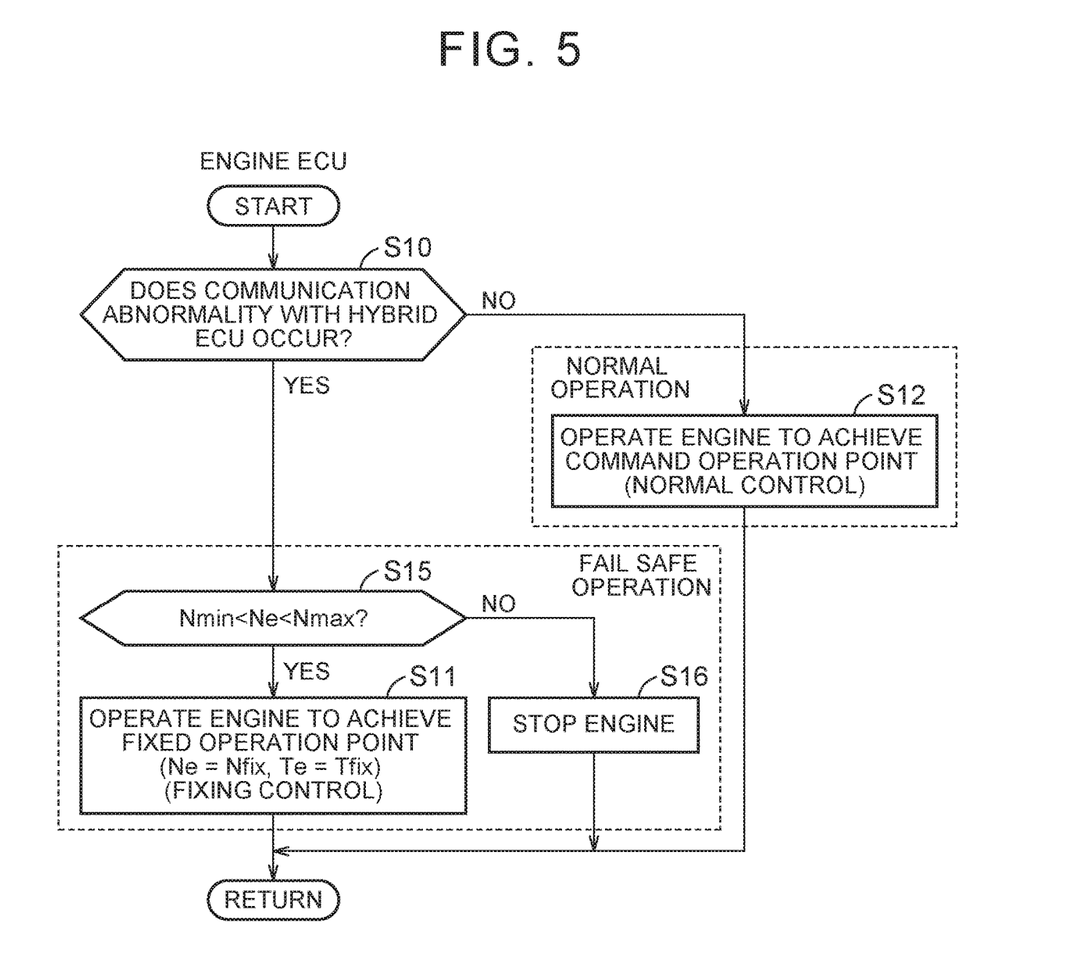
FIG. 5 is a flowchart (part 2) that shows a processing procedure of the engine ECU.

FIG. 5 is a flowchart that shows a processing procedure executed by the engine ECU 30. Note that, of steps shown in FIG. 5, steps that are denoted by the same reference numerals as the steps shown in above-described FIG. 3 have already been described and thus a detailed description thereon will not be made herein.

If the communication abnormality with the hybrid ECU 40 occurs (YES in S10), the engine ECU 30 executes the fail safe operation in S15 onward.

In S15, the engine ECU 30 determines whether the engine speed Ne detected by the engine speed sensor 10 falls within a range from a lower limit speed Nmin to an upper limit speed Nmax. Here, the lower limit speed Nmin is a value that is obtained by subtracting the specified value α from the fixed speed Nfix (=Nfix−α), and the upper limit speed Nmax is a value that is obtained by adding the specified value α to the fixed speed Nfix (=Nfix+α).

If the engine speed Ne falls within the range from the lower limit speed Nmin to the upper limit speed Nmax (YES in S15), that is, if the engine speed Ne does not deviate from the fixed speed Nfix by the specified value α or larger, the engine ECU 30 executes the above-described "fixing control" in S11. That is, the engine ECU 30 operates the engine 100 such that the engine operation point becomes the predetermined fixed operation point.

On the other hand, if the engine speed Ne does not fall within the range from the lower limit speed Nmin to the upper limit speed Nmax (NO in S15), that is, if the engine speed Ne deviates from the fixed speed Nfix by the specified value α or larger, the engine ECU 30 does not execute the fixing control but stops the engine 100 to bring the engine speed Ne to 0 in S16.

Figure 6:
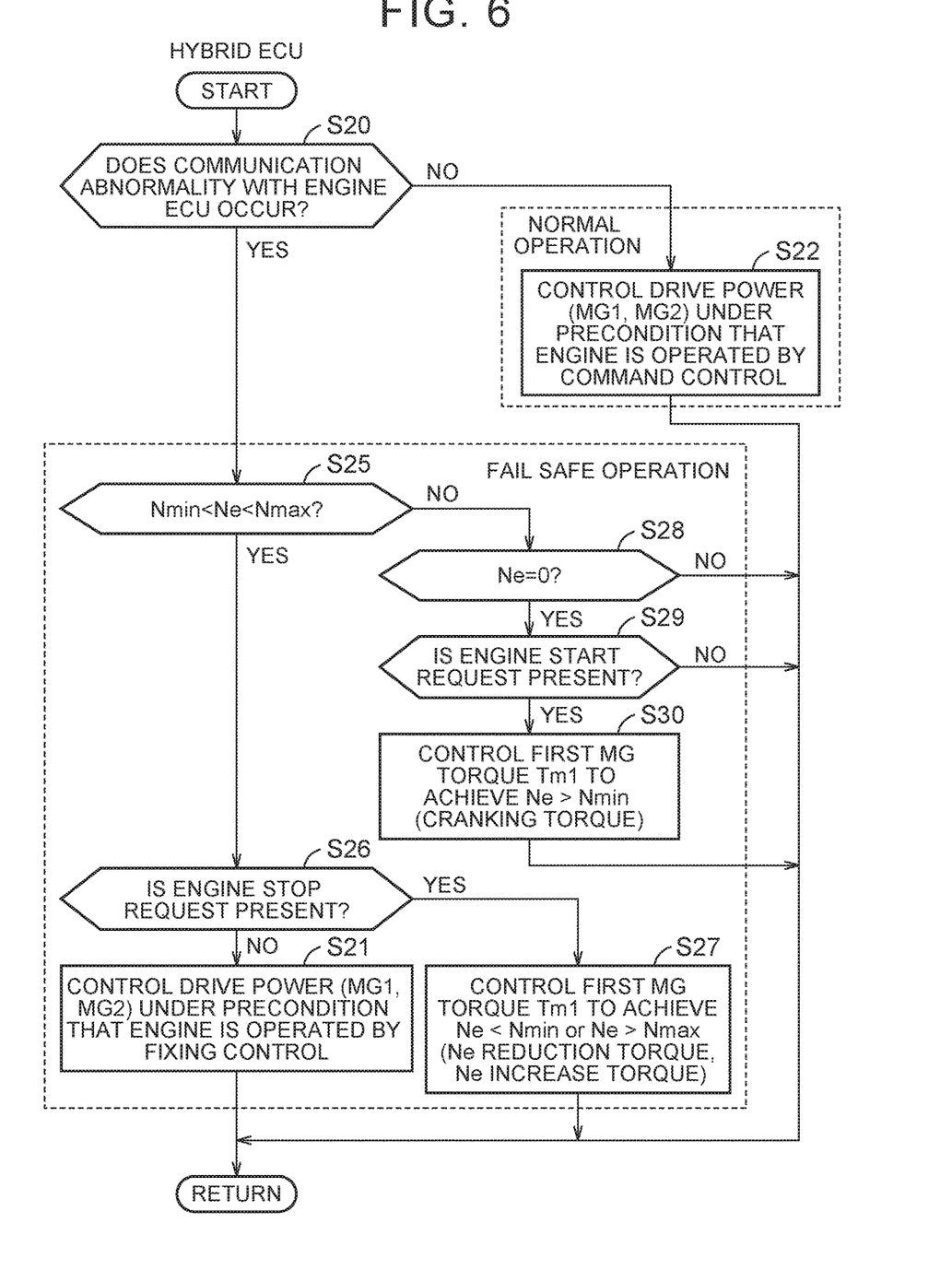
FIG. 6 is a flowchart (part 2) that shows a processing procedure of the hybrid ECU.

FIG. 6 is a flowchart that shows a processing procedure executed by the hybrid ECU 40. Note that, of steps shown in FIG. 6, steps that are denoted by the same reference numerals as the steps shown in above-described FIG. 4 have already been described and thus a detailed description thereon will not be made herein.

If the communication abnormality with the engine ECU 30 occurs (YES in S20), the hybrid ECU 40 executes the fail safe operation in S25 onward.

In S25, the hybrid ECU 40 determines whether the engine speed Ne falls within the range from the lower limit speed Nmin to the upper limit speed Nmax. Note that the hybrid ECU 40 cannot obtain the information on the engine speed Ne from the engine ECU 30 when the ENG-HV communication abnormality occurs; however, the hybrid ECU 40 can compute the engine speed Ne from the relationship in the collinear diagram by using the first MG rotational speed Nm1 and the second MG rotational speed Nm2 that are respectively detected by the resolvers 21, 22.

If the engine speed Ne falls within the range from the lower limit speed Nmin to the upper limit speed Nmax (YES in S25), the hybrid ECU 40 determines in S26 whether an engine stop request is present. For example, the hybrid vehicle 40 determines that the engine stop request is present if the requested drive power Preq is reduced to be lower than a specified value, if information indicating that the vehicle 1 collides with another object is obtained from another ECU, which is not shown, or if another control system abnormality occurs.

If the engine stop request is not present (NO in S26), the hybrid ECU 40 controls the drive power (the first MG 200 and the second MG 400) in S21 under the precondition that the engine 100 is operated by the fixing control.

If the engine stop request is present (YES in S26), the hybrid ECU 40 controls the first MG torque Tm1 in S27 such that the engine speed Ne becomes lower than the lower limit speed Nmin (=Nfix−α) or such that the engine speed Ne exceeds the upper limit speed Nmax (=Nfix+α). The hybrid ECU 40 increases a magnitude (an absolute value) of the first MG torque Tm1 in a negative direction when reducing the engine speed Ne to become lower than the lower limit speed Nmin. Meanwhile, the hybrid ECU 40 increases the magnitude (the absolute value) of the first MG torque Tm1 in a positive direction when increasing the engine speed Ne to become higher than the upper limit speed Nmax. Hereinafter, the first MG torque Tm1 that is controlled in the processing in S27 so as to bring the engine speed Ne to become lower than the lower limit speed Nmin is also referred to as "Ne reduction torque." In addition, the first MG torque Tm1 that is controlled in the processing in S27 so as to bring the engine speed Ne to become higher than the upper limit speed Nmax is also referred to as "Ne increase torque".

On the other hand, if the engine speed Ne does not fall within the range from the lower limit speed Nmin to the upper limit speed Nmax (NO in S25), the hybrid ECU 40 determines in S28 whether the engine speed Ne is 0 (whether the engine 100 is in a stopped state). If the engine speed Ne is not 0 (NO in S28), the hybrid ECU 40 terminates the processing.

If the engine speed Ne is 0 (YES in S28), the hybrid ECU 40 determines in S29 whether an engine start request is present. For example, the hybrid ECU 40 determines that the engine start request is present if the requested drive power Preq is increased to a specified value or larger. If the engine start request is absent (NO in S29), the hybrid ECU 40 terminates the processing.

If the engine start request is present (YES in S29), the hybrid ECU 40 controls the first MG torque Tm1 in S30 such that the engine speed Ne exceeds the lower limit speed Nmin (=Nfix−α). Hereinafter, the first MG torque Tm1 that is controlled in the processing in S30 so as to bring the engine speed Ne to become the lower limit speed Nmin or higher is also referred to as "cranking torque."

Figure 7:
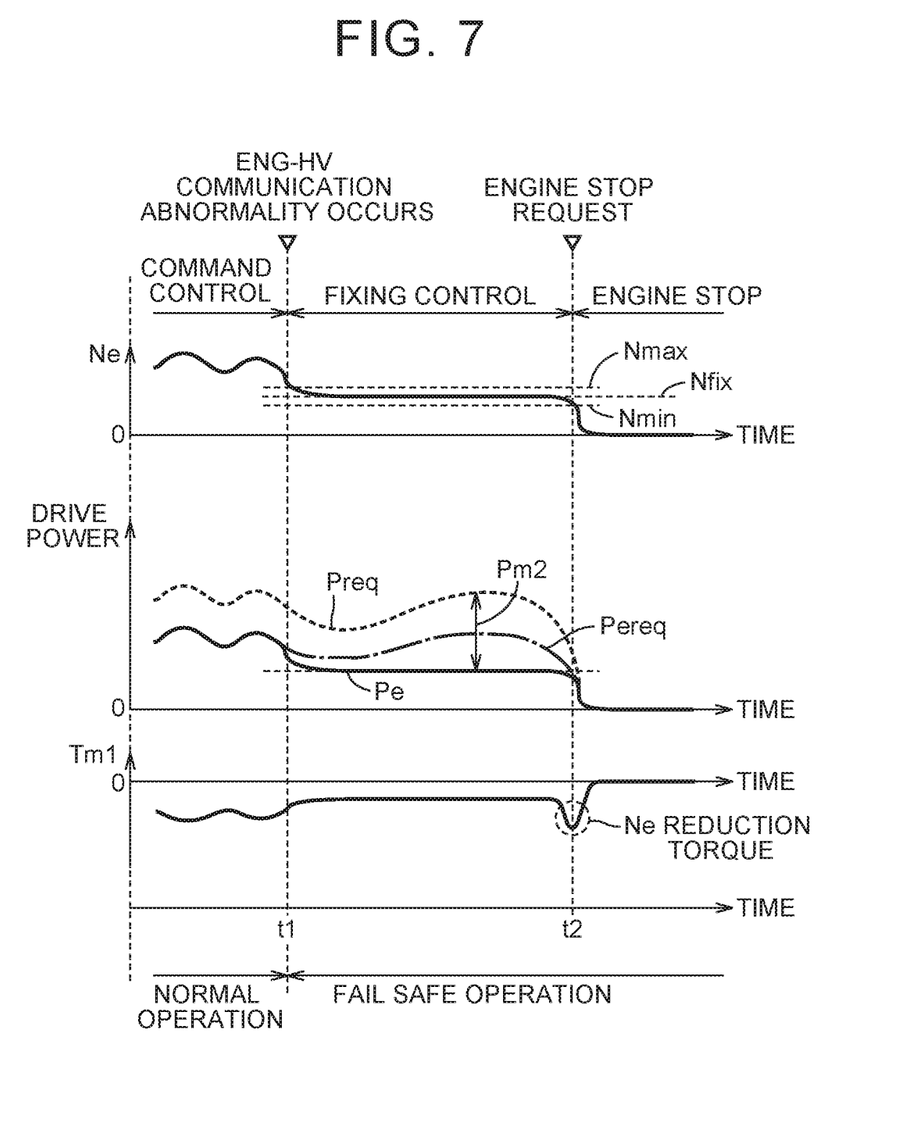
FIG. 7 is a chart of one example that shows changes in an engine speed Ne, drive power, and first MG torque Tm1 when an ENG-HV communication abnormality occurs.

FIG. 7 is a chart of one example that shows changes in the engine speed Ne, the drive power, and the first MG torque Tm1 when the ENG-HV communication abnormality occurs.

In a period before time t1, the ENG-HV communication abnormality does not occur, and the normal operation is performed. That is, the engine ECU 30 executes the "command control" in which the engine 100 is operated such that the engine operation point becomes the command operation point that follows the engine command signal received from the hybrid ECU 40. The hybrid ECU 40 controls the first MG 200 and the second MG 400 to satisfy the requested drive power Preq under the precondition that the engine 100 is operated by the command control.

When the ENG-HV communication abnormality occurs at the time t1, the normal operation is switched to the fail safe operation. That is, the engine ECU 30 executes the "fixing control" in which the engine 100 is operated such that engine operation point becomes the fixed operation point (the fixed speed Nfix and the fixed torque Tfix). In this way, in the example shown in FIG. 7, the engine power Pe is a lower value than the engine requested power Pereq (see a one-dot chain line in FIG. 7).

The hybrid ECU 40 controls the first MG 200 and the second MG 400 to satisfy the requested drive power Preq under the precondition that the engine 100 is operated by the fixing control. In the example shown in FIG. 7, the engine power Pe is not high enough for the engine requested power Pereq due to the operation of the engine 100 by the fixing control. Thus, the amount of shortage is added to the second MG power Pm2. As a result, even when the ENG-HV communication abnormality occurs, the vehicle 1 can evacuation-travel while the requested drive power Preq is satisfied.

When the engine stop request is made at time t2 due to a reduction in the requested drive power Preq, for example, the hybrid ECU 40 makes the first MG 200 generate the Ne reduction torque. More specifically, as shown in FIG. 7, the hybrid ECU 40 increases the first MG torque Tm1 in the negative direction. In this way, when the engine speed Ne becomes lower than the lower limit speed Nmin, the engine ECU 30 stops the engine 100. As a result, even when the ENG-HV communication abnormality occurs, the hybrid ECU 40 makes the first MG 200 generate the Ne reduction torque, and thereby the engine 100 can indirectly be stopped.

Figure 8:
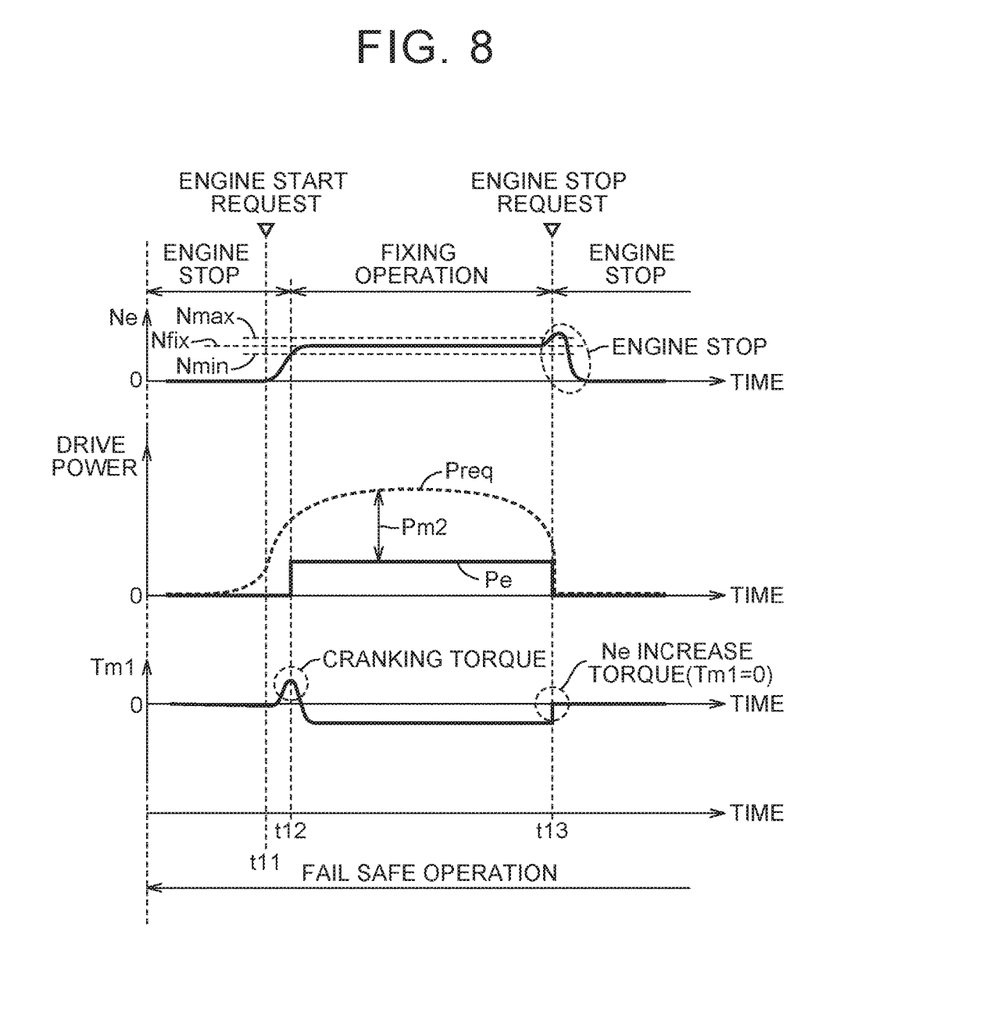
FIG. 8 is a chart of one example that shows changes in the engine speed Ne, the drive power, and the first MG torque Tm1 when an engine is started or stopped during a fail safe operation due to the ENG-HV communication abnormality.

FIG. 8 is a chart of one example that shows changes in the engine speed Ne, the drive power, and the first MG torque Tm1 when the engine 100 is started or stopped during the fail safe operation due to the ENG-HV communication abnormality.

In a period prior to time t11, the fail safe operation is performed. However, the requested drive power Preq is low, and the engine 100 is stopped.

When the engine start request is made at the time t11 due to an increase in the requested drive power Preq, the hybrid ECU 40 makes the first MG 200 generate the cranking torque. In this way, when the engine speed Ne exceeds the lower limit speed Nmin, the engine ECU 30 starts the engine 100 and executes the fixing control. As a result, even when the ENG-HV communication abnormality occurs, the hybrid ECU 40 makes the first MG 200 generate the cranking torque, and thereby the engine 100 can indirectly be started.

When the engine stop request is made at time t13 due to occurrence of an abnormality of another control system, for example, the hybrid ECU 40 makes the first MG 200 generate the Ne increase torque. More specifically, as shown in FIG. 7, the hybrid ECU 40 changes the first MG torque Tm1 from a negative value to 0. At this time, the first MG torque Tm1 may become 0 when the hybrid ECU 40 shuts down an inverter in the PCU 600 that controls the first MG 200.

When the first MG torque Tm1 becomes 0, a reaction force of the engine torque Te no longer exists, and the engine speed Ne is increased by an action of the engine torque Te. In this way, when the engine speed Ne exceeds the upper limit speed Nmax, the engine ECU 30 stops the engine 100. As a result, even when the ENG-HV communication abnormality occurs, the hybrid ECU 40 makes the first MG 200 generate the Ne increase torque, and thereby the engine 100 can indirectly be stopped.

As it has been described so far, when the communication abnormality with the hybrid ECU 40 occurs and the engine speed Ne deviates from the fixed speed Nfix by the specified value α or larger, the engine ECU 30 does not execute the fixing control but stops the engine 100. Thus, when the ENG-HV communication abnormality occurs, not only the engine 100 can be operated by the fixing control, but also the engine 100 can be stopped.

Furthermore, when the communication abnormality with the engine ECU 30 occurs and the engine stop request is present, the hybrid ECU 40 controls the first MG 200 such that the engine speed Ne deviates from the fixed speed Nfix by the specified value α or larger. In this way, even when the ENG-HV communication abnormality occurs, the hybrid ECU 40 can indirectly stop the engine.

Note that the engine 100 is stopped when the engine speed Ne deviates from the fixed speed Nfix by the specified value α or larger during the fail safe operation; however, a stop condition of the engine 100 is not limited thereto. For example, the engine 100 may be stopped when the engine torque Te deviates from the fixed torque Tfix by a specified value or larger. Alternatively, the engine 100 may be stopped when the engine power Pe deviates from a product of the fixed speed Nfix and the fixed torque Tfix by a specified value or larger.

A hybrid ECU 40B and the MG-ECU 50 may be integrated into one ECU 40A as shown in FIG. 9. In FIG. 9, the ECU 40A is one example of the "second electronic control unit." In this case, the MG-ECU 50 receives the first MG rotational speed Nm1 and the second MG rotational speed Nm2 from the resolver 21 and the resolver 22, respectively. The hybrid ECU 40B is connected to the engine ECU 30 and the MG-ECU 50 by communication lines, respectively, and mutually communicates with the engine ECU 30 and the MG-ECU 50 for overall control of the engine 100, the first MG 200, and the second MG 400. The hybrid ECU 40B outputs the engine command signal to the engine ECU 30 and outputs the first MG command signal and the second MG command signal to the MG-ECU 50. The hybrid ECU 40B also obtains information indicative of the state of the engine 100 from the engine ECU 30 and obtains information indicative of states of the first MG 200 and the second MG 400 from the MG-ECU 50. The MG-ECU 50 outputs the information indicative of the states of the first MG 200 and the second MG 400 (for example, the first MG rotational speed Nm1 and the second MG rotational speed Nm2 respectively detected by the resolvers 21, 22, and the like) to the hybrid ECU 40B. In addition, the MG-ECU 50 controls the output of the first MG 200 and the second MG 400 (more specifically, the energization amounts and the like) in accordance with the first MG command signal and the second MG command signal from the hybrid ECU 40B.

The disclosed embodiments are illustrative in all aspects, and thus they should not be considered as being restrictive. The scope of this disclosure is not limited by the above description, and includes all modifications to the disclosed embodiments.

What is claimed is:

1. A control system for a hybrid vehicle, the hybrid vehicle being configured to travel by using power of at least one of an engine and a rotary electric machine, the hybrid vehicle being configured to be able to output request drive power requested by a user, the control system comprising:

a first electronic control unit being programmed to control the engine; and a second electronic control unit being programmed to control the rotary electric machine, the second electronic control unit being programmed to output an engine command signal to the first electronic control unit through communication with the first electronic control unit, and the first electronic control unit being programmed to:

a) control the engine in accordance with the engine command signal received from the second electronic control unit, when a communication abnormality with the second electronic control unit does not occur; and b) execute fixing operation control in which the engine is controlled such that at least one of speed, output power, and output torque of the engine becomes a corresponding fixed value, when the communication abnormality with the second electronic control unit occurs.

2. The control system according to claim 1, wherein
the second electronic control unit is programmed to control the rotary electric machine so as to transmit the requested drive power to a drive wheel under a precondition that the engine is operated in accordance with the engine command signal, when a communication abnormality with the first electronic control unit does not occur, and
the second electronic control unit is programmed to control the rotary electronic machine so as to transmit the requested drive power to the drive wheel under a precondition that the engine is operated by the fixing operation control, when the communication abnormality with the first electronic control unit occurs.

3. The control system according to claim 1, wherein
the first electronic control unit is programmed to stop the engine without executing the fixing operation control in case where the communication abnormality with the second electronic control unit occurs and at least one of the speed, the output power, and the output torque of the engine deviates from the corresponding fixed value by a specified value or larger.

4. The control system according to claim 1, wherein
the engine is mechanically coupled to the rotary electric machine,
the first electronic control unit is programmed to output a stop request to stop the engine without executing the fixing operation control, when the communication abnormality with the second electronic control unit occurs and the speed of the engine deviates from a fixed value by a specified value or larger, and
the second electronic control unit is programmed to control the rotary electric machine such that the speed of the engine deviates from the fixed value by the specified value or larger, when a communication abnormality with the first electronic control unit occurs and the stop request is present.

* * * * *